Dec. 15, 1970    R. SHERMAN    3,546,792
INTERLOCKING MODULAR DESIGN BLOCKS
Filed June 10, 1968    2 Sheets-Sheet 1

Dec. 15, 1970   R. SHERMAN   3,546,792
INTERLOCKING MODULAR DESIGN BLOCKS
Filed June 10, 1968   2 Sheets-Sheet 2

United States Patent Office
3,546,792
Patented Dec. 15, 1970

3,546,792
INTERLOCKING MODULAR DESIGN BLOCKS
Raymond Sherman, 172 E. 88th St.,
New York, N.Y. 10028
Filed June 10, 1968, Ser. No. 735,656
Int. Cl. A63h 33/08
U.S. Cl. 35—27                   1 Claim

ABSTRACT OF THE DISCLOSURE

A set of modular design elements includes a number of T elements, a number of S elements, and a number of U elements. The T elements are of two different designs. Each type of element is distinctively colored, and the relative dimensions of the elements are such that they can be nested together in an endless number of different patterns.

BACKGROUND OF THE INVENTION

This invention relates to modular design elements and, more particularly, to a set of novel elements that can be nested together to form a multiplicity of different patterns.

Architects and designers of interiors frequently desire to create artistic visual patterns in a wide variety of surfaces, including floors, ceilings, interior and exterior walls, and partitions. It is frequently desired that the patterns include color. Various desired patterns can be created in a number of ways, including the use of paint and colored tile. Conventional means for creating the desired patterns are quite laborious, however. Moreover, in many instances the results leave much to be desired.

Educators concerned with the education not only of architects and interior designers but also of the very young are particularly interested in the educational value of modular design units. Such units have great value in teaching principles of construction and design, in facilitating visualization and evaluation of proposed designs, and in fostering an appreciation of color and form. Conventional design elements for this purpose typically snap together rather than nest together and present only limited possibilities for experimentation.

SUMMARY OF THE INVENTION

An object of the present invention is to remedy the problems outlined above. In particular, an object of the invention is to provide modular design elements a plurality of which can be used to produce artistic designs in color. Another object of the invention is to provide a set of modular design elements that are highly desirable as playthings for children and as instructional aids even to advanced students of architecture and interior design.

The foregoing and other objects of the invention are attained, in a representative two-dimensional embodiment thereof, by the provision of a set of geometrical design elements comprising a first plurality of elements of a first shape and at least one additional plurality of elements of a second shape, each of the shapes being defined by a plurality of unit squares, each of the unit squares having a side in common with at least one other unit square but no four of the unit squares having a corner in common, and each element of the first plurality of elements being colored in accordance with a first scheme and each element of the second plurality of elements being colored in accordance with a second scheme. In this way, the elements can be nested together in a multiplicity of different ways to form any of a multiplicity of different patterns.

Preferably, the design elements are three-dimensional blocks, so that they can stand as a separate structure or partition and need not be adhered to a parallel supporting surface. The blocks are of at least two types, each type having a different shape. Each of the shapes is defined by a plurality of unit cubes, and each of the unit cubes has a face in common with at least one other unit cube but no four of the unit cubes have an edge in common.

In the preferred embodiment of the invention, the forms, whether two-dimensional or three-dimensional, have generally the shape of T's, S's and U's, the forms of each type being colored differently from the forms of other types.

BRIEF DESCRIPTION OF THE DRAWING

An understanding of additional aspects of the invention may be gained from a consideration of the following detailed description of representative embodiments thereof and of several ways in which they can be employed, taken in conjunction with the appended figures of the drawing, in which.

DESCRIPTION OF THE PREFERRED EMBODIMENT

Figure 1:
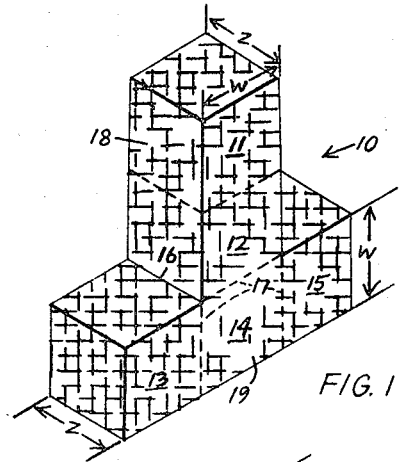
FIG. 1 is a perspective view of a first form of T block in accordance with the invention.

FIG. 1 shows a first type of block 10 constructed in accordance with the invention. The block 10 is herein referred to as a T block because its shape resembles that of a capital T. The T block 10 may be regarded as formed of a plurality of unit cubes 11, 12, 13, 14, and 15. Each of the unit cubes 11–15 has a face in common with at least one other unit cube, but no four of the unit cubes have an edge in common. As many as three unit cubes may have an edge in common in accordance with the invention. Thus, the edge 16 is shared by the unit cubes 12, 13, and 14, and a corresponding edge (not visible) is shared by the unit cubes 12, 14, and 15.

The boundaries separating the unit cubes are delimited by lines 17, which may but need not be imaginary.

The unit cubes 11 and 12 form a first elongated member 18, and the unit cubes 13, 14, and 15 form a second elongated member 19. An end of the first member 18 abuts the middle of the second member 19.

The T block 10 is preferably given a distinctive color: for example, yellow.

Figure 2:
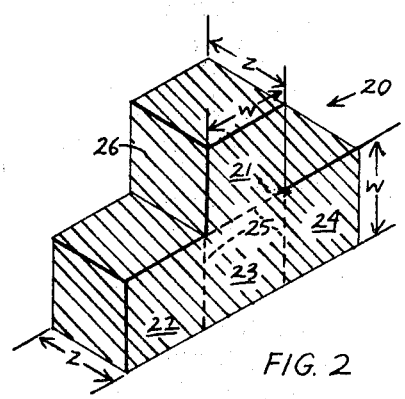
FIG. 2 is a perspective view of a second form of T block in accordance with the invention.

FIG. 2 shows a second form of T block 20 in accordance with the invention. The T block 20 is smaller than the T block 10 and is formed of only four unit cubes 21, 22, 23, and 24. The boundaries between the unit cubes are delimited by lines 25, which may but need not be imaginary.

The unit cube 21 constitutes a first member 26, which, unlike the member 18, is not elongated (i.e., it is of square cross section in the plane of the T), and the unit cubes 22, 23, and 24, constitute a second member 27, which, like the member 19, is elongated. The first member 26 abuts the middle of the second member 27.

The T block 20 is preferably given a second distinctive color: for example, green.

Figure 3:
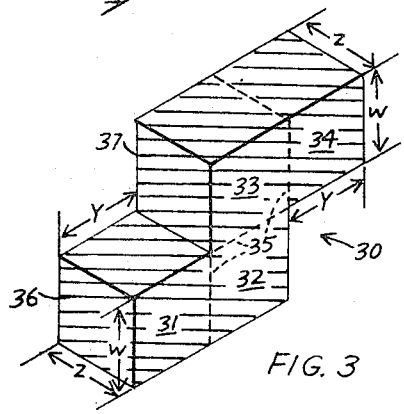
FIG. 3 is a perspective view of an S block in accordance with the invention.

FIG. 3 shows a third form of block 30 in accordance with the invention. The block 30 is an S block which may be regarded as formed by a plurality of unit cubes 31, 32, 33, and 34, the boundaries between which are delimited by lines 35, which may but need not be imaginary.

The unit cubes 31 and 32 form a first elongated member 36, and the unit cubes 33 and 34 form a second elongated member 37, the members 36 and 37 being laterally offset, parallel, contiguous, and in part (unit cubes 32 and 33) longitudinally overlapping and in part (unit cubes 31 and 34) longitudinally offset from each other.

The S block 30 is preferably given a third distinctive color: for example, blue.

Figure 4:
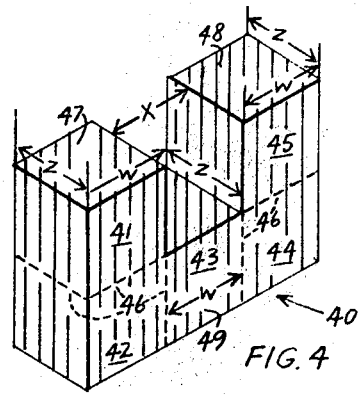
FIG. 4 is a perspective view of a U block in accordance with the invention.

FIG. 4 shows a representative U block 40 constructed in accordance with the invention. The U block 40 may be regarded as composed of a number of unit cubes 41, 42, 43, 44, and 45, the boundaries between which are delimited by lines 46, which may but need not be imaginary.

The unit cubes 41 and 42 form a first elongated member 47, and the unit cubes 44 and 45 form a second elongated member 48 having a length equal to the length of the member 47. The elongated members 47 and 48 are parallel and laterally spaced apart from each other.

The unit cube 43 forms a third member 49, which is not elongated, connecting adjacent ends of the members 47 and 48.

The U block of 40 is preferably given a fourth distinctive color: for example, red.

The blocks 10, 20, 30, and 40 are specially designed with respect to one another to permit the blocks to be nested together. In particular, the unit cubes of which each may be regarded as composed are of equal size, so that:

(1) The lateral width W of each of the members 18, 19 (block 10); 26, 27 (block 20); 36, 37 (block 30); and 47, 48, 49 (block 40) is the same: namely, the width of one unit cube.

(2) The distance L by which the first and second members 36 and 37 of the S block 30 are laterally offset (measured from a given part one member to a corresponding part of the other member) is likewise equal to W or the width of a unit cube.

(3) The distance X between adjacent faces of the first and second members 47 and 48 of the U block 40 is also equal to the width of a unit cube.

(4) Adjacent ends of the first and second members 36 and 37 of the S blocks 30 are longitudinally offset a distance Y substantially equal to the lateral width of a unit cube.

(5) Each of the members 18, 19, 26, 27, 36, 37, 47, 48, and 49 has a thickness Z normal to the respective planes of the T's, S's, and U's substantially equal to the width of a unit cube.

FIGS. 5–9 show, respectively, but five of an indefinite number of different ways in which the blocks of FIGS. 1–4 can be nested together.

Figure 5:
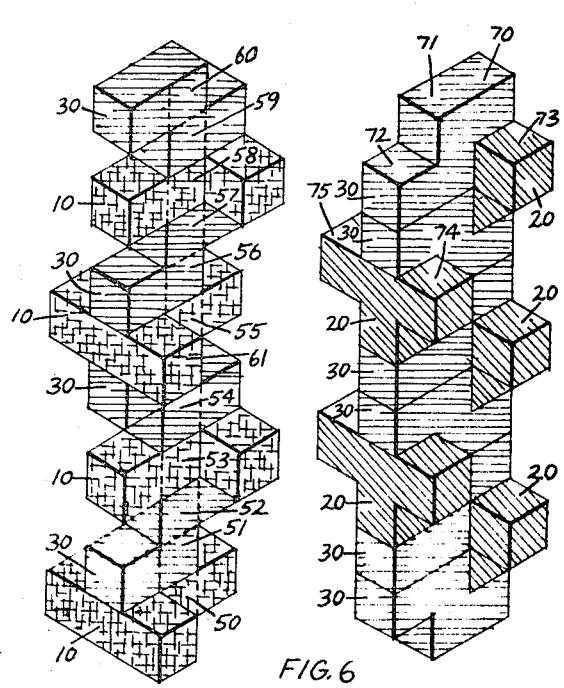
FIGS. 5–9 are perspective views showing, respectively, five representative ways in which the blocks of FIGS. 1–4 can be nested together.

FIG. 5 shows a plurality of T blocks 10 alternating with a plurality of S blocks 30 in a column eight blocks tall. The T blocks 10 face alternately to the left and to the right, and the S blocks 30 face alternately to the left and to the right. Thus, the uppermost S block 30 is oriented identically to the second S block 30 (fourth block) below it. The T blocks 10 lie in horizontal planes, while the S blocks 30 lie in vertical planes. A column of unit cubes twelve cubes high is formed, there being only one such column extending without interruption from the bottom of the stack to the top. Unit cubes 50, 51, 52, 53, 54, 55, 56, 57, 58, 59, and 60 are visible in the figure. The twelfth unit cube in the vertical column, part of the lower middle S block 30, is between the unit cubes 54 and 55 and hidden by the unit cube 61.

Figure 6:
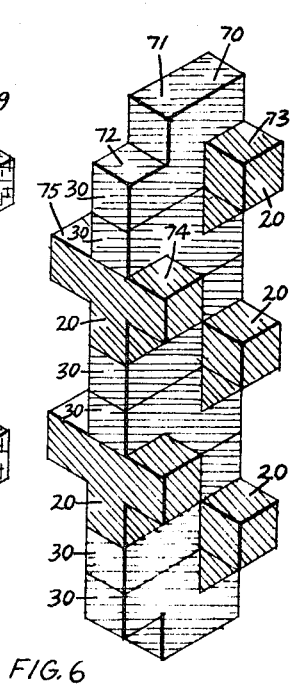

FIG. 6 shows another arrangement of blocks in accordance with the invention. Six S blocks 30 are arranged in a vertical plane stacked one on top of another and facing alternately to the left and to the right. Five small T blocks 20 are mounted right side up in spaced-apart parallel vertical planes at opposite ends of the S's. In this arrangement, there are two columns of unit cubes each twelve unit cubes high. These columns are 70 and 71. A column 72 has ten unit cubes and is ten unit cubes long, a column 73 has three unit cubes and is nine unit cubes long, and columns 74 and 75 have two unit cubes and are five unit cubes long. A column similar to the column 73 is on the opposite side of the structure and not visible from the perspective of FIG. 6.

Figure 7:
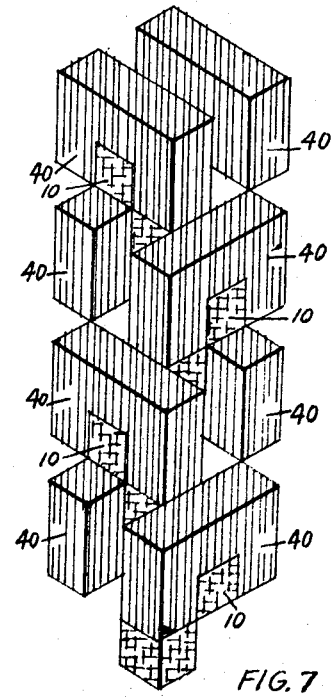

FIG. 7 shows another representative arrangement of blocks according to the invention. A plurality of T blocks 10 are arranged upright, the blocks lying alternately in vertical planes that intersect each other at right angles. On each arm of each T block 10 is mounted an upside-down U block 40, the U blocks 40 on each T block 10 being in parallel spaced-apart vertical planes, the planes of the U blocks 40 mounted on a given T block 10 being at right angles to the planes of the U blocks 40 mounted on an adjacent T block 10. In this arrangement, there is no column of unit cubes as high as the entire structure, which is 13 unit cubes tall.

Figure 8:
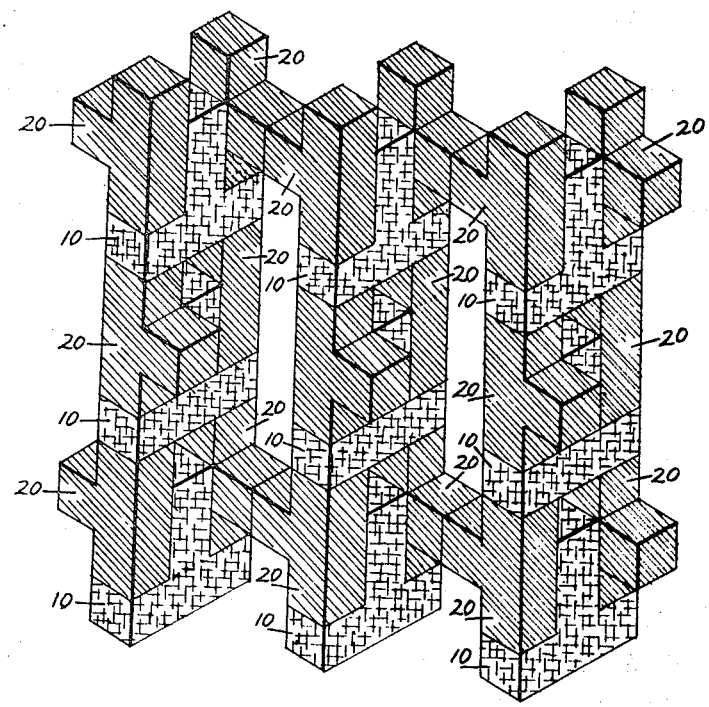

FIG. 8 shows another arrangement of blocks according to the invention. Twenty-seven blocks are employed, of which nine are large T blocks 10 and the balance are small T blocks 20. The T blocks 10 are arranged upside-down in three parallel, spaced-apart vertical planes, there being three T blocks 10 in each plane. On each arm of each T block 10 is mounted a small T block 20. Each T block 20 is horizontal but lies in a vertical plane normal to the vertical planes of the large T blocks 10. The T blocks 20 in each plane face alternately to the right and to the left.

Figure 9:
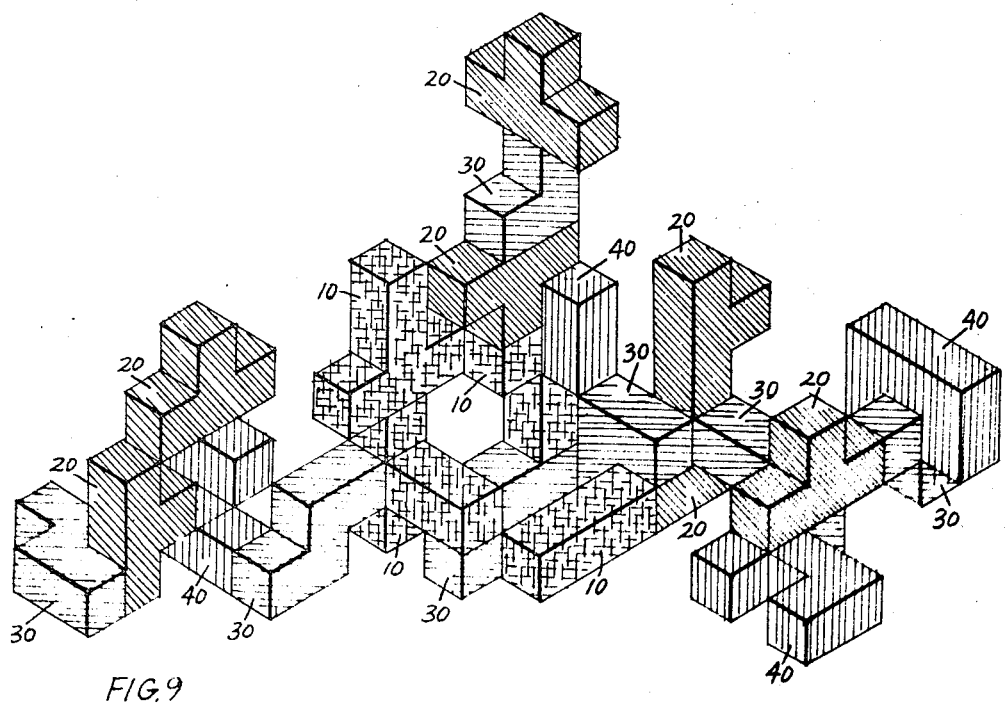

FIG. 9 shows another arrangement of blocks according to the invention. Twenty-two blocks are employed, of which four are large T blocks 10, seven are small T blocks 20, seven are S blocks 30 and four are U blocks 40.

The T blocks 10 are clustered near the center of the structure, one being in a horizontal plane, one being in a vertical plane and extending horizontally, and two being in vertical planes, one right side up and the other upside down.

The T blocks 20 are all arranged in vertical planes, four being upside down, one being right side up, and two extending horizontally.

The S blocks 30 are arranged in vertical planes, except for the left-hand S block, which is in a horizontal plane.

One of the U blocks 40 is in a horizontal plane, and the remainder are in parallel, spaced-apart vertical planes, two of the latter U blocks 40 being upside down and the third being horizontal.

Clearly, the number of designs that can be made in accordance with the invention is indefinitely large, and the designs of FIGS. 5–9 are merely suggestive of the utility of the invention.

Thus there is provided in accordance with the invention a set of novel blocks having utility in architectural and interior design and in the education not only of students of architecture and interior design but also of the very young. Many modifications within the spirit and scope of the invention will readily occur to those skilled in the art. For example, the principles of the invention are applicable to two-dimensional forms composed of unit squares, such as flat cardboard T's, S's and U's. FIGS. 1–4 illustrate the two dimensional forms, the thickness Z being disregarded. Also, where the blocks are of sufficient size, they lend themselves to the construction of playground apparatus inviting exploration by children. Moreover, each distinctive color need not be solid but may consist of a number of colors, arranged in stripes, for example; or, since form can function without color, the blocks may be transparent. Accordingly, the invention is to be construed as including all of the modifications thereof within the scope of the appended claim.

I claim:

1. A set of blocks comprising (a) a plurality of T blocks each including a first member and a second elongated member, an end of the first member abutting the middle of the second member, (b) a plurality of S blocks each including first and second elongated members, the members being laterally offset, parallel, contiguous, and in part longitudinally overlapping and in part longitudinally offset from each other, and (c) a plurality of U blocks each including first and second parallel, laterally-spaced-apart, elongated members and a third member connecting adjacent ends thereof, said blocks being characterized in that (a) the lateral width of each of said members in the respective planes of the T's, S's, and U's, (b) the distance by which the first and second members of the S blocks are laterally offset, and (c) the distance between adjacent edges of the first and second members of the U blocks are substantially equal, whereby said blocks can be nested together in a multiplicity of patterns, and in that the T blocks comprise a plurality of large T blocks of which said first member is elongated and a plurality of small T blocks of which said first member is of square cross section in the plane of the small T, all said large T blocks having a first color, all said small T blocks a second, all said S blocks a third, and all said U blocks a fourth.

References Cited

UNITED STATES PATENTS

| | | | |
|---|---|---|---|
| 2,147,237 | 2/1939 | Bluthardt | 46—25 |
| 2,377,100 | 5/1945 | Patterson | 35—22 |
| 2,623,303 | 12/1952 | Mindel | 35—22 |
| 3,410,021 | 11/1968 | Patterson | 273—106X |
| 3,449,857 | 6/1969 | Christopher | 46—25 |

FOREIGN PATENTS

| | | | |
|---|---|---|---|
| 1,219,634 | 12/1959 | France | 46—25 |
| 1,154 | 1906 | Great Britain | 273—160 |
| 420,349 | 11/1934 | Great Britain | 46—24 |

HARLAND S. SKOGQUIST, Primary Examiner

U.S. Cl. X.R.

46—25; 273—160